United States Patent Office 3,393,324
Patented July 16, 1968

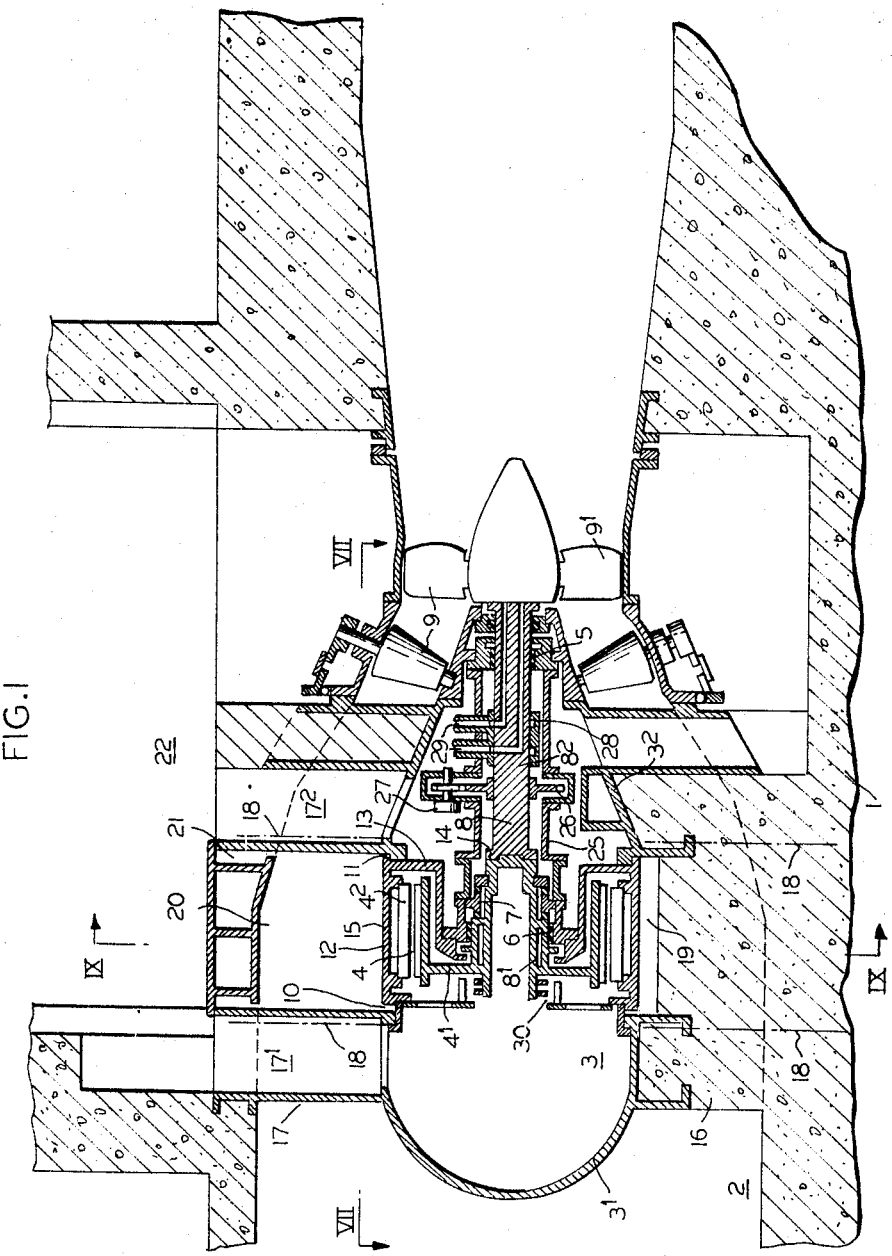

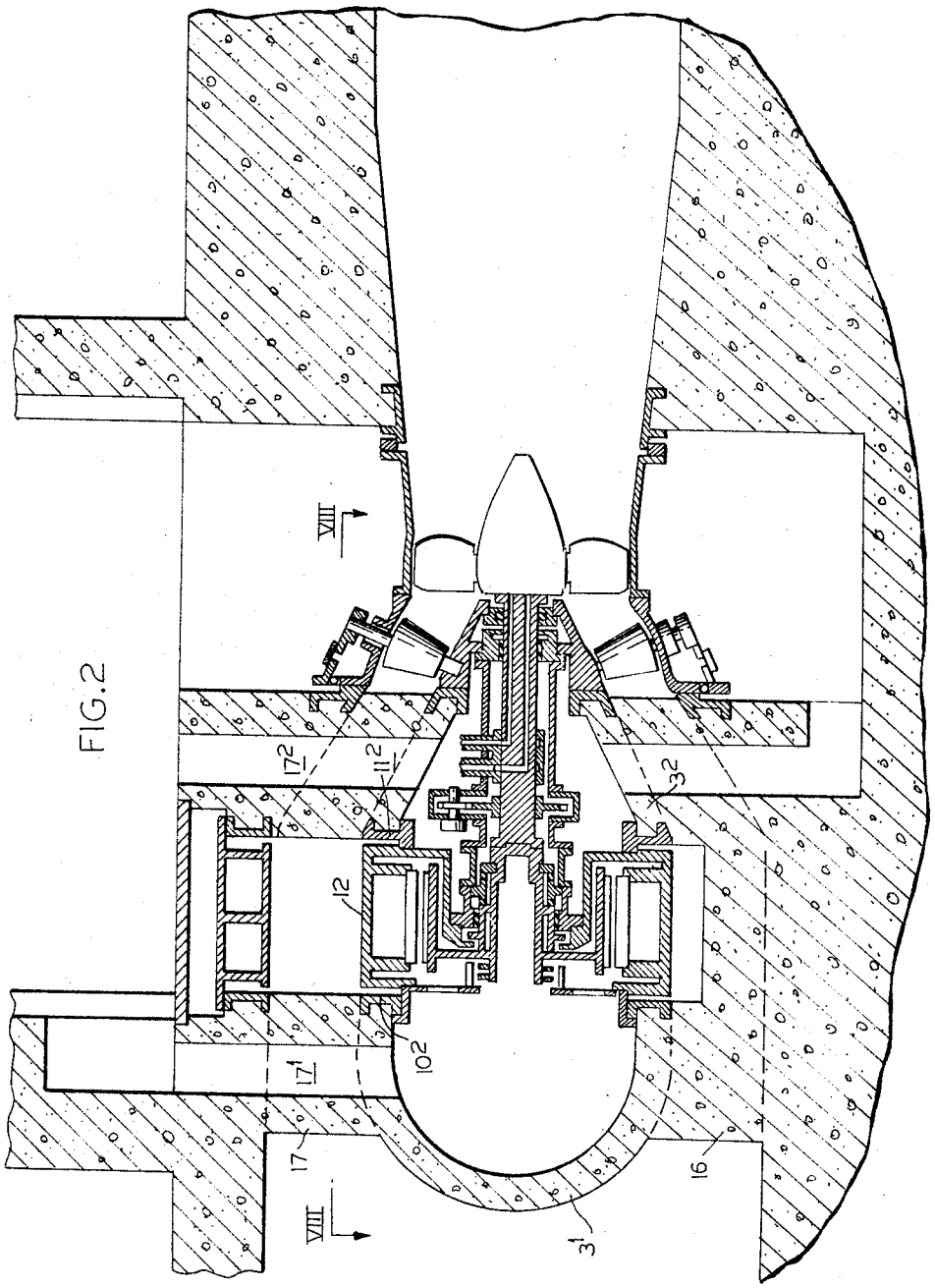

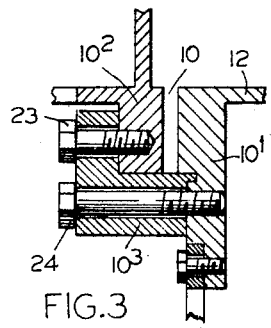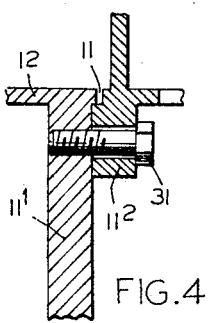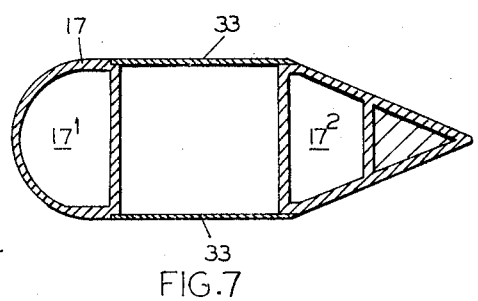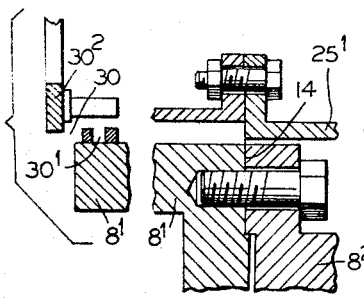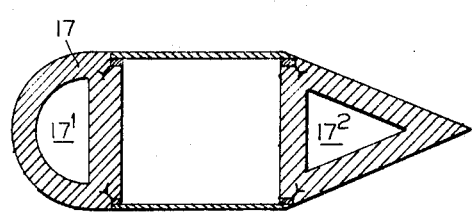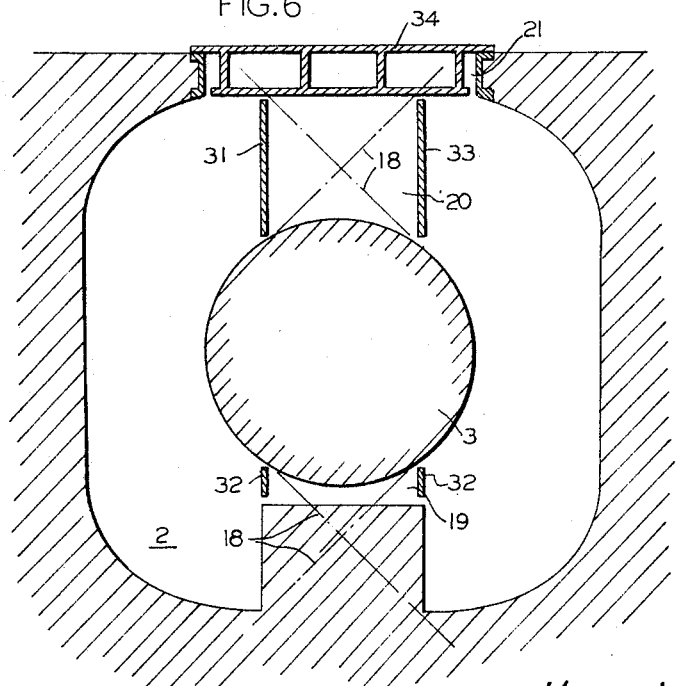

3,393,324
TUBULAR TURBINE
Hans Hauser, Otelfingen, and Jürgen Langhans, Zurich, Switzerland, assignors to Escher Wyss Aktiengesellschaft, Zurich, Switzerland, a corporation of Switzerland
Filed Aug. 23, 1965, Ser. No. 481,494
Claims priority, application Switzerland, Aug. 27, 1964, 11,249/64
8 Claims. (Cl. 290—52)

ABSTRACT OF THE DISCLOSURE

A hydroelectric machine set arranged in a water duct and having a shaft carrying in overhang fashion the electric machine rotor and the hydraulic machine runner, and a housing consisting of a front part, an intermediate piece and a runner-side part; said intermediate piece containing the electric machine, a separable portion of said shaft and one bearing, and being separable from said front and runner-side parts in planes perpendicular to the axis of said shaft; said duct having an opening to allow removal of said intermediate piece together with the elements contained therein.

---

This invention relates to a hydroelectric machine set having a housing adjoining the runner of the hydraulic machine, fully submerged in the operating water and enclosing the electrical machine, in which housing are also situated the two bearings of the shaft carrying in overhung fashion at its one end the runner of the hydraulic machine, and at its other end the rotor of the electrical machine.

In such machine sets, which are very short in the axial direction, that is to say, in the direction of flow of the operating water, heretofore for the removal of the electrical machine, the housing hub associated with said machine was dismounted. Thereupon the rotor, detached from the shaft, and the stator had first to be moved away from the shaft in the axial direction, until the rotor or stator ring was out of range of the shaft or shaft bearing, and could then be removed upwardly. The axial movement during removal necessitated a corresponding length of the masonry dam cross section, and dismountability of the housing hub rendered difficult satisfactory mounting of the stator relatively to the foundation.

It is the object of the invention to improve the machine set in this respect. In a hydroelectric machine set of the hereinbefore described type, the housing has, according to the invention, two separations, each extending in a plane which is substantially perpendicular to the axis of the machine, and a radially removable intermediate piece is provided between these planes, and contains the stator of the electrical machine with end connecting flanges extending substantially to the respective plane of separation, the rotor of the electrical machine, the shaft bearing situated next to the electrical machine, as well as its bearing bracket connected to the stator or to a connecting flange, as well as a shaft portion extending to the runner-side plane of separation, which shaft portion is detachably connected to the remainder of the shaft by a rigid coupling.

The drawing illustrates constructional examples of the invention in simplified form.

FIG. 1 shows a vertical axial section through a machine set,

FIG. 2 shows a corresponding section through another embodiment,

FIGS. 3 to 6 show portions of FIG. 1 on a larger scale,

FIG. 7 shows a section on the line VII—VII in FIG. 1,

FIG. 8 shows a section on the line VIII—VIII in FIG. 2, and

FIG. 9 shows a section on the line IX—IX in FIG. 1.

The hydroelectric power plant shown in FIG. 1 has a foundation 1 with an operating water duct 2, in which is situated a housing 3, fully submerged in the operating water and enclosing an electrical machine 4. Also situated in the housing 3 are the two radial bearings 5 and 6 and the axial bearing 7 of a shaft 8 carrying in overhung fashion at one end the runner $9^1$ of the hydraulic machine 9, situated in the operating water stream and at its other end the rotor $4^1$ of the electrical machine 4, also in overhung fashion.

The housing 3 has two separations 10, 11, each of which extends in a plane of separation perpendicular to the axis of the shaft 8. Situated between said two planes of separation 10, 11 is a radially removable intermediate piece 12, containing the stator $4^2$ of the electrical machine 4, with end connecting flanges $10^1$ and $11^1$, extending to the respective plane of separation, the rotor $4^1$, the radial bearing 6, situated next to the electrical machine 4, and the axial bearings 7, together with the bearing bracket 13, which connects the bearings 6, 7 to the connecting flange $11^1$, i.e. to the stator $4^2$. The intermediate piece 12 furthermore contains a shaft portion $8^1$, which carries the rotor $4^1$, is journalled in the bearings 6 and 7 and extends to the runner-side plane of separation. It is detachably connected to the remaining shaft part $8^2$ by a rigid coupling 14.

The wall 15 of the intermediate piece 12, situated between the two planes of separation 10, 11, is a component of the stator $4^2$ of the electric machine, and the connecting flanges $10^1$, $11^1$ are flanges of the intermediate piece 12 at the same time. The wall 15 forms the supporting ring of the stator $4^2$ of the electrical machine 4.

The two housing parts situtated outside the region occupied by the intermediate piece 12, i.e. the front part $3^1$ and the runner-side part $3^2$, are supported by two ribs 16 and 17, which are wide, seen in the axial direction of the machine set, and connect the front housing part $3^1$ as well as the runner-side housing part $3^2$ to the walls of the operating water duct 2. The flanges $10^2$ and $11^2$ of the housing parts $3^1$ and $3^2$, which flanges adjoin the connecting flanges $10^1$ and $11^1$, are additionally held by tie rods, anchored in the walls of the operating water duct 2 and engaging the housing 3 substantially tangentially, so that the housing 3 and the stator $4^2$ of the electrical machine 4, which stator is situated in the intermediate piece 12, are securely and non-rotationally held in the foundation 1. The tie rods, not shown, extend inside the ribs 16 and 17, as indicated by the chain lines (see also FIG. 9).

Spaces 19 and 20, wetted by the operating water, are left free between the ribs 16 and 17 and the intermediate piece 12. The space 19 only includes the immediate surrounding of the intermediate piece 12; the space 20 extends over the full height of the rib 17 and adjoins an opening 21 connecting the operating water duct 2 to the platform 22 of the foundation 1. In the axial direction of the machine set, the space 20 and the opening 21 occupy the region bounded by the planes of separation 10, 11. In the horizontal, situated at right angles to the axial direction, the space 20 extends over the full width of the rib 17, and the opening 21 extends over a range exceeding somewhat the diameter of the intermediate piece 12.

The shaft 8 is surrounded by a tubular shell 25, containing an oil bath, which extends from bearing 5 to bearing 6 and is composed of a number of individual parts. It has a separation, situated in the runner-side plane of separation 11 of the intermediate piece 12. In the region situated between the bearings 5 and 6, 7, a gearwheel 26 is mounted on the shaft 8 for driving a pendulum generator 27 and auxiliary units, not shown. A sleeve 28 serves for introducing the control oil ducts 29 into the shaft 8 for the runner blade pitch adjustment. On the side of the electrical machine 4, next to the front housing part $3^1$, an exciter 30 having a rotor $30^1$, fast on the shaft piece $8^1$, and a stator $30^2$, connected to the connecting flange $10^1$ (FIG. 5) as well as generator brakes, not shown, are arranged in the intermediate piece 12, also within the space bounded by the two planes of separation 10, 11.

For removing the electrical machine 4 from the housing 3, after disconnecting the electrical machine supply and return leads, not shown, draining the operating water duct 2 and emptying the shell 25, the shell piece $25^1$ is removed, whereupon the coupling 14, between the shaft portion $8^1$ and shaft part $8^2$ can be disengaged, as will be seen better from FIG. 6. After disengagement of the coupling 14, the intermediate piece 12 is detached from the housing part $3^1$.

Since the two housing parts $3^1$, $3^2$, limiting the intermediate piece 12, are indetachably secured to the foundation, the separation 10 is provided with a movable flange ring $10^3$, arranged between the connecting flange $10^1$ and the flange $10^2$ of the front housing part $3^1$, as shown more clearly in FIG. 3. The flange ring $10^3$ is centered in the flange $10^2$ and in the connecting flange $10^1$, and after disconnection of the screws 23, 24 connecting it to the parts $10^1$, $10^2$, it can be moved axially to the left in the drawing.

When the flange ring has been moved accordingly, the connection between the intermediate piece 12 and the runner-side housing part $3^2$ is also disconnected by unscrewing the screws 31 connecting the connecting flange $11^1$ to the flange $11^2$ (FIG. 4). The intermediate piece 12 is then shifted axially to the left in the drawing until the connecting flange $11^1$ has moved out of the centring means, centring it with the flange $11^2$. The gap between the parts $10^1$, $10^2$ is wider, for this purpose, than the width of the centring means between the parts $11^1$, $11^2$ and $8^1$, $8^2$.

The intermediate piece 12 and the parts contained in it can now be moved radially of the axis of the machine set through the space 20 and opening 21. It is thus possible to make the length of the dam cross section, in the direction of flow of the operating water, particularly the width of the crane track and platform, substantially shorter, resulting in a considerable saving of building and machine costs.

As shown in FIGS. 7 and 9, the spaces 19 and 20, wetted by the operating water and left free within the rib profile, are limited from the flow space of the operating water duct 2 by guide plates 32, 33. During operation, the opening 21 is closed by a cover 34. The rib 17 has two manholes $17^1$ and $17^2$, connecting the housing parts $3^1$ and $3^2$ to the platform 22.

The bearing bracket 13, shown diagrammatically in the drawing, and which carries the bearings 6 and 7 situated in the intermediate piece 12, instead of having a disc-shaped and tubular part, may also have a conical part connecting the actual bearing body 6 to the connecting flange $11^1$.

The machine set according to FIG. 2 differs from that according to FIG. 1 by the formation of the housing parts $3^1$ and $3^2$ and the ribs 16 and 17 in concrete construction. The flanges $10^2$ and $11^2$ are accordingly constructed as steel rings anchored in the concrete. The manholes $17^1$ and $17^2$ are openings left free in the concrete, as is also shown in FIG. 8.

Instead of centring of the intermediate piece 12 in relation to the housing parts $3^1$ and $3^2$ being effected by means of the cylindrical surface extending coaxially with the machine axis, such centring could be effected by means of centring pins provided in the flange connection, which would result in smaller clearance between the intermediate piece 12 and housing parts $3^1$, $3^2$. In certain circumstances, the planes of separation 10, 11 of the flange connections could be slightly inclined to each other instead of being parallel, that is to say they could be made divergent in the removal direction.

Due to the fact that the bearings 6 and 7, together with their bearing bracket as well as the exciter 30, lie substantially within the cylinder defined by the diameter and axial length of the stator $4^2$, the intermediate piece 12 is very short, despite the many parts situated inside it.

For removal of the intermediate piece 12, the rotor $4^1$ may be wedged to the stator $4^2$, and the stator-side end of the shaft part $8^2$ remaining in the housing part $3^2$ may be supported by means of an assembly bearing.

If the walls of the ribs 16, 17 are made of suitably thick dimensions, the tie rods 18 indicated in FIGS. 1 and 9, may be omitted. Apart from the two ribs 16, 17, there are no fittings in the operating water duct in the region of the electrical machine 4.

What is claimed is:

1. In a hydroelectric power plant having walls defining an operating water duct, a hydroelectric machine set arranged in said duct and comprising a hydraulic machine having a runner, an electric machine having a stator and a rotor, a shaft carrying in overhung fashion at its one end the runner of said hydraulic machine and at its other end the rotor of said electric machine; at least two bearings for said shaft; a housing enclosing said electric machine, said bearings and part of said shaft; said housing consisting of a front part, an intermediate piece and a runner-side part; said intermediate piece containing the electric machine and a portion of said shaft with one of said bearings and being separable from said front part and said runer-side part in planes extending substantially perpendicular to the axis of said shaft; means for rigidly connecting said front housing part as well as said runner-side housing part to the walls of said duct; said shaft being detachably connected to the remainder of said shaft in the region of said plane of separation between said intermediate piece and said runner-side housing part; and the wall of said water duct having an opening in the region of said intermediate piece adapted to allow removal of said intermediate piece together with said electric machine and said shaft portion with said bearing, contained therein.

2. In a hydroelectric power plant the combination as defined in claim 1 in which said intermediate piece is a component of the stator of said electric machine.

3. In a hydroelectric power plant the combination as defined in claim 1 in which said means for rigidly connecting said front housing part as well as said runner-side housing part to the walls of said duct include tie rods being anchored in the walls of said duct, and engaging said housing parts substantially tangentially.

4. In a hydroelectric power plant the combination as defined in claim 1 in which said means for rigidly connecting said front housing part as well as said runner-side housing part to the walls of said duct comprise one under and one upper vertical rib; said under rib connecting the bottom of said housing parts to the walls of said duct; said upper rib having a front portion connecting the top of said front housing part to the walls of said duct, and a runner-side portion connecting the top of said runner-side housing part to the walls of said duct; said front portion and said runner-side portion of said upper rib leaving a space between each other adapted to allow removal of said intermediate piece together with said electric machine and said shaft portion with said bearing, contained therein; said intermediate piece and said under rib leaving another space between each other; guide plates detachably connected to said ribs, limiting said spaces from the room outside the profile of said ribs.

5. In a hydroelectric power plant the combination as defined in claim 1 in which said bearing contained in said intermediate piece comprises axial bearing means as well as radial bearing means.

6. In a hydroelectric power plant the combination as defined in claim 1 in which an exciter for said electric machine is situated in said intermediate piece in the room confined by said two planes of separation.

7. In a hydroelectric power plant the combination as defined in claim 1 in which a tubular oil shell surrounds said shaft, said shell being separable in the region of said plane of separation between said intermediate piece and said runner-side housing part.

8. In a hydroelectric power plant the combination as defined in claim 4 in which said front housing part, said runner-side housing part, and said ribs are made in concrete construction, each of said housing parts comprising a steel ring being anchored in the concrete for connecting said intermediate piece to said housing parts.

No references cited.

ORIS L. RADER, *Primary Examiner.*

G. SIMMONS, *Assistant Examiner.*